United States Patent [19]

Ryham

[11] Patent Number: 4,975,148
[45] Date of Patent: Dec. 4, 1990

[54] COLD BLOW SYSTEM FOR BATCH PRODUCTION OF PULP

[75] Inventor: Rolf Ryham, Princeton, N.J.

[73] Assignee: Ahlströmföretagen Svenska AB, Norrköping, Sweden

[21] Appl. No.: 280,683

[22] Filed: Dec. 6, 1988

[51] Int. Cl.⁵ .................. D21C 7/08; D21C 7/12; D21C 9/04
[52] U.S. Cl. ...................... 162/47; 162/60; 162/233; 162/242; 162/246; 162/375; 68/181 R
[58] Field of Search ........ 162/47, 60, 52, 375, 162/239, 233, 242, 251, 246; 68/181 R

[56] References Cited

U.S. PATENT DOCUMENTS

| | | | |
|---|---|---|---|
| 1,860,836 | 5/1932 | Gustin | 162/251 |
| 3,348,390 | 10/1967 | Richter | 68/181 R |
| 3,475,271 | 10/1969 | Laakso | 162/251 |
| 3,524,551 | 8/1970 | Richter | 68/181 R |
| 3,567,573 | 3/1971 | Case | 162/60 |
| 3,595,038 | 7/1971 | Bergholm | 162/60 |
| 3,622,262 | 11/1971 | Leffler | 162/60 |
| 3,729,961 | 5/1973 | Leffler | 68/181 R |
| 3,807,202 | 4/1974 | Gunkel | 162/242 |
| 4,042,452 | 8/1977 | Arhippuinen | 162/60 |
| 4,123,318 | 10/1978 | Sherman | 162/242 |
| 4,212,705 | 7/1980 | Babington | 162/239 |
| 4,213,882 | 7/1980 | Eriksson | 68/181 R |
| 4,215,447 | 8/1980 | Gartland | 168/181 R |
| 4,840,047 | 6/1989 | Richter | 162/60 |

FOREIGN PATENT DOCUMENTS

| | | | |
|---|---|---|---|
| 927164 | 5/1973 | Canada | 162/242 |
| 1135101 | 11/1982 | Canada | 162/47 |

Primary Examiner—David L. Lacey
Assistant Examiner—Thomas M. Lithgow
Attorney, Agent, or Firm—Cohen, Pontani & Lieberman

[57] ABSTRACT

A method and system for cooling pulp discharged from a batch type digester and recovering heat from it. A stream of pulp together with spent cooking liquor is discharged from a batch digester to a diffuser and passed through the diffuser at substantially the same pressure as that of the digester. The pulp stream is caused to flow between screens and hot spent cooking liquor is displaced with cooler liquor flowing across the pulp stream thereby lowering the temperature of the pulp stream. The displayed cooking liquor and the pulp is withdrawn from the diffuser.

6 Claims, 1 Drawing Sheet

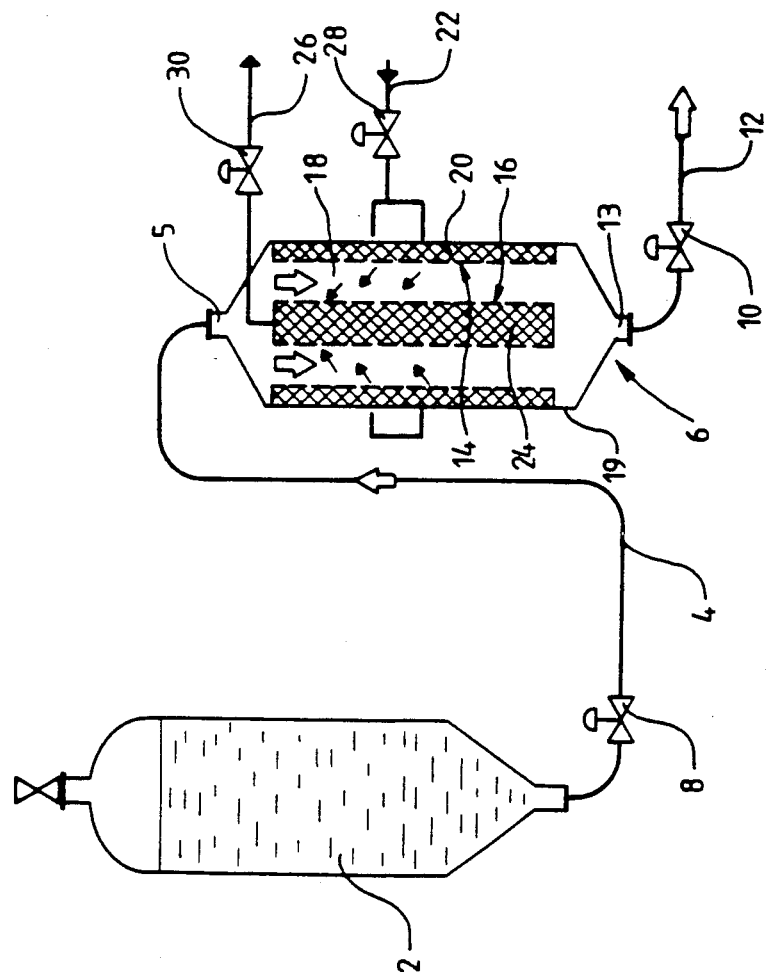

COLD BLOW SYSTEM FOR BATCH PRODUCTION OF PULP

FIELD OF THE INVENTION

The present invention relates generally to improvements in the batch production of pulp and more specifically to a method of cooling pulp discharged from a batch type digester and recovering heat from the pulp.

BACKGROUND OF THE INVENTION

In the batch pulping process, wood chips and cooking liquor are loaded into a digester which is then closed. The pressure and the temperature within the digester are then raised by admitting steam to the digester to cook the chips whereby the chemicals of the cooking liquor react with the lignin which binds the fibers together and the lignin is dissolved. At the end of the cooking step, the content of the digester is, using a prior art method, forced out from the digester to a blow tank at near atmospheric pressure. Due to the sudden pressure drop, the hot liquor within the chips vaporizes tending to break up the chips into individual fibers. A large amount of steam is released during the blow period. The steam is condensed by direct contact with cooled condensate and the condensate is collected in an accumulator to be used as a heat medium in auxiliary portions of the pulping process. The pulp and the spent cooking liquor is passed to pulp washers where the liquor is washed from the pulp. The energy recovery rate of this system is relatively low.

It is known that discharging of the pulp from the digester at the cooking temperature, i.e. about 170° C., tends to cause damage to the fibers and to lower the pulp strength. It has therefore been necessary to lower the temperature of the pulp before it is blown out of the digester. This method, known as Cold Blow, is accomplished by introducing liquor from the pulp washing section at a temperature of 70°–90° C. to the bottom of the digester. The temperature in the blow line of the digester will be about 5° C. higher than the temperature of the liquor added. The systems in which cooling of the pulp is brought about in the digester are quite complicated. To install a cold blow system into an existing digester requires extensive rebuilding of the digester and a long shutdown time.

U.S. Pat. No. 3,567,573 discloses a process in which the cooked wood chips together with the hot cooking liquor is discharged from a digester to a vessel at a pressure significantly lower than that to which it is exposed in the digester. Through the reduction in pressure, the chips are defibered by expansion of the liquid in the chips. The resulting pulp is washed and cooled by a weak and relatively cool black wash liquor which is introduced through nozzles disposed in the lower part of the vessel. The wash liquor is caused to flow upwardly through the vessel and counter to the flow of the hot pulp-liquor mass. A relatively hot and stronger black wash liquor flows out through screens located in the upper part of the vessel. The cooled and washed pulp is withdrawn in a continuous flow. The major portion of the heat present in the chip and liquor mass is converted into steam.

It is accordingly an object of the present invention to provide an economical cold blow method by which heat can be recovered at a high energy recovery rate in batch type pulp digesting systems.

It is another object of the present invention to provide a simple cold blow system which is easy to install in existing pulp digesting systems.

A further object of the present invention is to provide a cold blow system which is easy to operate and control.

Whereas prior art systems recover heat as steam, it is one of the characteristic features of the present invention that the pulp together with the spent cooking liquor is discharged from the digester substantially without any steam generation, i.e. that the major portion of the heat is recovered as sensible heat in a hot liquor stream.

SUMMARY OF THE INVENTION

In accordance with the present invention, a stream of pulp together with spent cooking liquor is discharged from a batch digester to a diffuser and passed through the diffuser at substantially the same pressure as that present in the digester. The pulp stream is caused to flow between screens and hot spent cooking liquor is displaced with cooling liquor flowing across the pulp stream thereby lowering the temperature of the pulp stream. The displaced cooking liquor and the pulp is withdrawn from the diffuser.

BRIEF DESCRIPTION OF THE DRAWING

The invention is described more in detail below with reference to the attached drawing, which is a schematic flow diagram illustrating a typical cold blow system for a batch type pulp digestion process.

DETAILED DESCRIPTION OF THE PRESENTLY PREFERRED EMBODIMENT

As shown in the drawing a digester 2 in which wood chips are digested with cooking liquor at an elevated pressure and temperature is connected by a blow line 4 to an inlet 5 located in the top portion of a diffuser 6. Usually several digesters are connected to the same diffuser. A regulating valve 8 is disposed in the blow line between each digester and the diffuser. Another regulating valve 10 which may be, for example, a fixed orifice or HIC valve, is disposed in discharge line 12 connected to an outlet 13 located in the bottom portion of the diffuser. The temperature of the outflowing pulp stream is controlled by a temperature sensor (not shown) in line 12.

Two concentric cylindrical screen means 14 and 16 are disposed in the diffuser so as to define a ring-shaped flow passage 18 for pulp and liquor. The outer screen means 14 together with the wall of the diffuser housing 19 forms a first liquor chamber 20 to which an inlet line 22 is connected for admitting cooling liquor, e.g. from a pulp washer, whereby the cooling liquor has a temperature which is lower than the temperature of the spent cooking liquor. The inner screen means 16 forms a second liquor chamber 24 to which an outlet line 26 is connected. Suitable screen means are known in the art but are generally of a mesh size sufficiently wide to permit passage of the liquor but sufficiently narrow to prevent the passage of the pulp therethrough. Regulating valves 28 and 30 are disposed in the inlet and outlet lines 22 and 26 respectively.

The principle of operation of the cold blow system is as follows:

Assuming the diffuser is full of pulp from the previous blow, the valve 8 between the digester and the diffuser is opened whereby the pressure in the digester and diffuser is equalized. The valve 10 located downstream of the diffuser is opened whereupon pulp together with spent cooking liquor having a temperature of, for instance, 170° C. is forced out from the digester and caused to flow through the diffuser by the gases from the digester. In the diffuser the pulp flows through the ring-shaped flow passage 18 formed between the screen means 14,16 and is then withdrawn from the diffuser and passed to a blow tank through line 12. The flow rate of the pulp is controlled by valve 10. Cooling liquor having a temperature of from about 90° C. to about 100° C. is supplied through line 22 from a washer to the first liquor chamber 20 of the diffuser to be introduced into the ring-shaped flow passage and substantially evenly distributed into it by the outer screen means 14. The liquor then flows substantially across the ring-shaped flow passage thereby displacing the hot spent cooking liquor in the pulp stream. The displaced cooking liquor at a temperature of about 165° C. is withdrawn through the inner screen means 16 into second liquor chamber 24 and passed therefrom through line 26 to an accumulator (not shown), to be used to heat white liquor, pre-steam chips or the pre-evaporation of black liquor.

The flow rates of the liquor flowing into the diffuser through screen means 14 and out from the diffuser through screen means 16 is controlled by valves 28 and 30 so as to maintain a constant temperature of about 95° C. in the pulp stream flowing out from the diffuser.

While a preferred embodiment has been shown and described, it will be understood that the invention is intended to cover all modifications and alternate constructions falling within the scope of the invention as defined in the appended claims.

What is claimed is:

1. A method for cooling pulp discharged from a batch type digester and for recovering heat from the pulp comprising the steps of:
    (a) passing a stream of pulp together with hot spent cooking liquor under pressure from the digester through a diffuser substantially without the generation of steam and at substantially the same pressure as that present in the digester;
    (b) causing the pulp stream to flow between two screen means in the diffuser;
    (c) displacing said hot spent cooking liquor from the pulp stream in the diffuser with cooling liquor by causing the cooling liquor to flow from one screen means to the other screen means substantially perpendicularly to the pulp stream, the cooling liquor having a temperature lower than the temperature of the spent cooking liquor thereby lowering the temperature of said pulp stream; and
    (d) withdrawing the displaced cooking liquor from the diffuser through said other screen means.

2. The method of claim 1, utilizing as the cooling liquor in step (c) wash liquor from a pulp washer.

3. The method of claim 2, wherein said one screen means comprises a cylindrical screen means and said other screen means comprises cylindrical screen means, said one and said other screen means being concentrically disposed in the diffuser.

4. The method of claim 1, comprising the additional step of controlling the flow rate of the pulp stream passing through the diffuser.

5. The method of claim 1, wherein the spent liquor is displaced with cooling liquor so that the temperature of the pulp in the diffuser is lowered in step (c) to a temperature from about 90° to 100° C.

6. The method of claim 1, additionally comprising the step of controlling the withdrawal of the displaced cooking liquor.

* * * * *